(12) United States Patent
Price

(10) Patent No.: US 10,808,081 B2
(45) Date of Patent: Oct. 20, 2020

(54) POWDER COMPOSITIONS COMPRISING THERMOPLASTIC PARTICLES AND FLOW PROMOTER PARTICLES, METHOD OF PREPARING ARTICLES AND COATINGS FROM THE POWDER COMPOSITIONS, AND ARTICLES PREPARED THEREFROM

(71) Applicant: SABIC Global Technologies B.V., Bergen op Zoom (NL)

(72) Inventor: Brian Price, Evansville, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 152 days.

(21) Appl. No.: 15/757,195

(22) PCT Filed: Sep. 2, 2016

(86) PCT No.: PCT/US2016/050059
§ 371 (c)(1),
(2) Date: Mar. 2, 2018

(87) PCT Pub. No.: WO2017/040897
PCT Pub. Date: Mar. 9, 2017

(65) Prior Publication Data
US 2018/0244862 A1  Aug. 30, 2018

Related U.S. Application Data

(60) Provisional application No. 62/214,466, filed on Sep. 4, 2015.

(51) Int. Cl.
*B32B 5/16* (2006.01)
*C08J 3/12* (2006.01)
(Continued)

(52) U.S. Cl.
CPC ............. *C08J 3/124* (2013.01); *B29C 64/153* (2017.08); *B33Y 70/00* (2014.12); *C08J 3/28* (2013.01);
(Continued)

(58) Field of Classification Search
CPC ................................ C08K 3/01; B29C 64/153
See application file for complete search history.

(56) References Cited

U.S. PATENT DOCUMENTS

| 4,758,616 A | 7/1988 | Okano et al. |
| 6,136,948 A | 10/2000 | Dickens, Jr. et al. |

(Continued)

FOREIGN PATENT DOCUMENTS

| JP | 3281094 | 5/2002 |
| WO | 9606881 | 3/1996 |

(Continued)

OTHER PUBLICATIONS

Ziegelmeier et al., Characterizing the Bulk & Flow Behaviour of LS Polymer Powders, Aug. 16, 2013 (Year: 2013).*

(Continued)

*Primary Examiner* — Hoa (Holly) Le
(74) *Attorney, Agent, or Firm* — Cantor Colburn LLP

(57) ABSTRACT

A powder composition includes a plurality of thermoplastic particles and a plurality of flow promoting particles having an optimized flow, coalescence, or both; and methods of preparing three-dimensional articles and methods of preparing a powder coating, and articles prepared by the methods are described herein.

19 Claims, 2 Drawing Sheets

(51) Int. Cl.
*C08J 3/28* (2006.01)
*C08K 3/22* (2006.01)
*B33Y 70/00* (2020.01)
*B29C 64/153* (2017.01)
*C08K 3/36* (2006.01)

(52) U.S. Cl.
CPC ............ *C08K 3/22* (2013.01); *C08J 2300/22* (2013.01); *C08J 2379/08* (2013.01); *C08K 3/36* (2013.01)

(56) References Cited

U.S. PATENT DOCUMENTS

| | | | |
|---|---|---|---|
| 2004/0204531 A1* | 10/2004 | Baumann | A61K 8/88 |
| | | | 524/492 |
| 2006/0223928 A1* | 10/2006 | Monsheimer | C08K 3/32 |
| | | | 524/416 |
| 2008/0122141 A1 | 5/2008 | Bedal et al. | |
| 2013/0052453 A1* | 2/2013 | Filou | C08J 3/12 |
| | | | 428/327 |

FOREIGN PATENT DOCUMENTS

| | | | | |
|---|---|---|---|---|
| WO | WO-2012156173 A1 * | 11/2012 | ............... | C09D 5/00 |
| WO | 2015157148 A1 | 10/2015 | | |

OTHER PUBLICATIONS

Degussa, Aerosil 200. (Year: 2006).*
Evonik, Safety Data Sheet, Aerosil 200 (Year: 2015).*
International Search Report for the International Application No. PCT/US2016/050059; International Filing date: Sep. 2, 2016; dated Nov. 30, 2016; 6 pages.
Written Opinion of the International Searching Authority for International Application PCT/US2016/050059; International filing date: Sep. 2, 2016; dated Nov. 30, 2016; 7 pages.

* cited by examiner

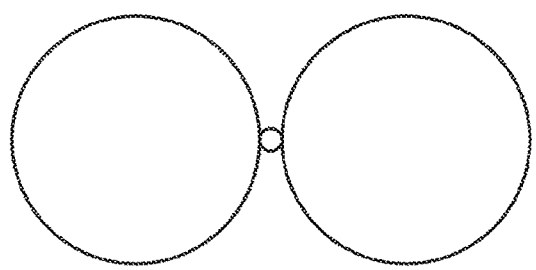
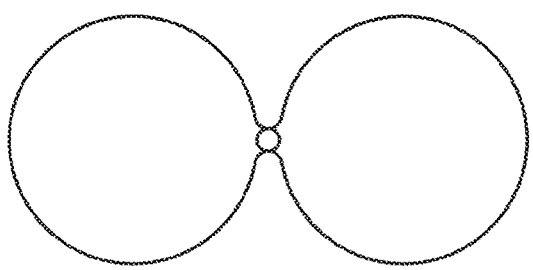
Fig. 1      Fig. 2
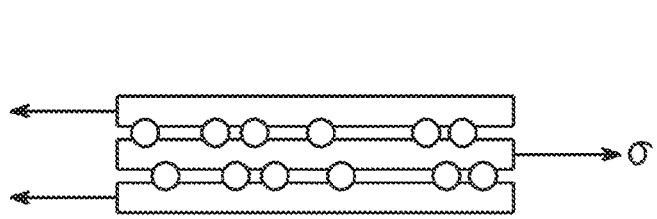
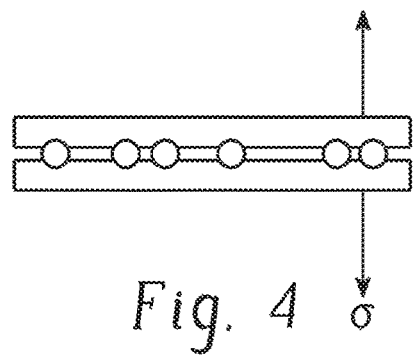
Fig. 3      Fig. 4
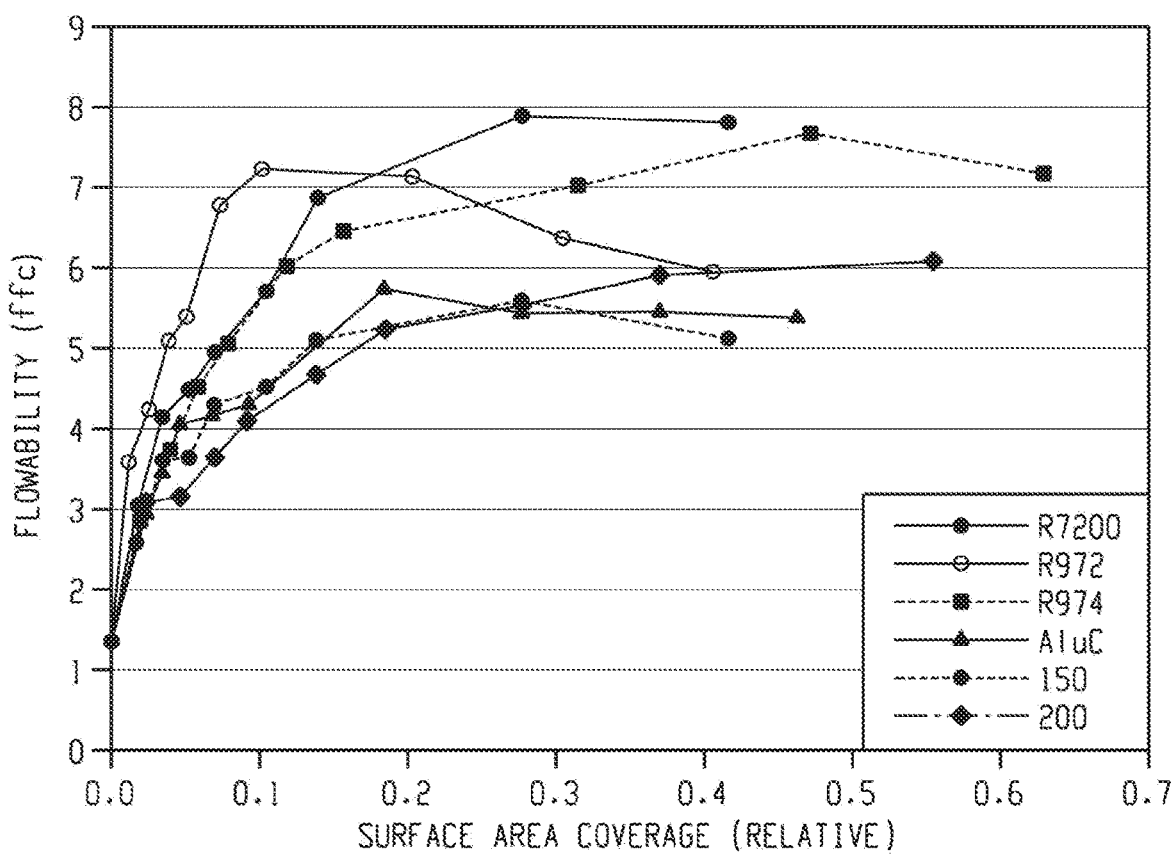
Fig. 5

POWDER COMPOSITIONS COMPRISING THERMOPLASTIC PARTICLES AND FLOW PROMOTER PARTICLES, METHOD OF PREPARING ARTICLES AND COATINGS FROM THE POWDER COMPOSITIONS, AND ARTICLES PREPARED THEREFROM

CROSS-REFERENCE TO RELATED APPLICATIONS

This application is a National Stage application of PCT/US2016/050059, filed Sep. 2, 2016, which claims the benefit of U.S. Provisional Application No. 62/214,466, filed Sep. 4, 2015, both of which are incorporated by reference herein in their entirety.

BACKGROUND

A number of manufacturing processes make use of particulate thermoplastic polymer compositions, commonly known in the art as "powder compositions." The powder compositions are generally deposited and heated to sinter or coalesce the particles to form a layer or an article. Additive manufacturing (AM, also known as "three-dimensional" or "3D" printing) is a process for the manufacture of three-dimensional objects by formation of multiple fused layers. AM methods using powder compositions include powder bed fusing. In powder bed fusing, thermal energy selectively fuses regions of a powder bed. In particular, selective laser sintering (SLS) is a powder bed fusion process using one or more lasers to fuse powdered thermoplastic polymers into the desired three-dimensional shape. In powder coating processes, the powder composition is applied to a surface, for example electrostatically, to form a layer, and then heated, allowing the particles to coalesce and form a film. Powder compositions have also been compression molded to form articles.

Despite their long use, there remains a need in the art for powder compositions having optimized powder properties, in particular flow and coalescence of the particles. Flow properties can be improved by use of nanoparticulate flow promoters. Such flow promoters can adversely affect the properties of the final articles, especially when used in higher quantities. Maintaining an optimal balance between flow and coalescence upon heating the particles can also be difficult. Powder compositions having optimized flow or coalescing properties, or both are therefore desired.

BRIEF DESCRIPTION

A powder composition comprises a plurality of thermoplastic particles having an outer surface, and characterized by a D50 size from 10 nanometer to 1 millimeter, and a plurality of flow promoter particles having an outer surface, and characterized by a mean size from 1 nanometer to 500 micrometer, wherein the mean size is at least 50%, at least 60%, or 70-99.99% smaller than the D50, preferably 80 to 99.99% smaller than the D50, more preferably 99.95 to 99.98% smaller than the D50; wherein the amount of flow promoter particles is selected to provide a surface area concentration (SAC) of 0.05 to 0.95, preferably 0.10 to 0.60, more preferably 0.15 to 0.50, in accordance with the relationship:

$$SAC = \frac{m_g}{m_h}\left(\frac{\rho_h R_h^3}{4\rho_g(R_h+R_g)^2 R_g}\right)$$

wherein SAC is the surface area concentration of the flow promoter particles on the outer surface of the thermoplastic particles; Rh is the average radius of the thermoplastic particles, Rg is the average radius of the flow promoter particles, $\rho_h$ is the average density of the thermoplastic particles, $\rho_g$ is the average density of the flow promoter particles, $m_h$ is the mass value of the thermoplastic particles, and $m_g$ is the mass value of the flow promoter particles.

A powder composition comprises a plurality of thermoplastic particles comprising thermoplastic composition, the particles having a first mean size from 10 nanometer to 1 millimeter, and a plurality of flow promoter particles comprising a flow promoter composition, and having a second mean size from 1 nanometer to 500 micrometer, wherein the second mean size is at least 50%, at least 60%, or 70-99.99% smaller than the first mean size, preferably 80 to 99% smaller than the first mean size, more preferably 95 to 98% smaller than the first mean size; and wherein a contact angle θ between a flat surface comprising the flow promoter composition and a thermoplastic particle at a coalescence temperature of the plurality of thermoplastic particles is less than 150 degrees, or 10 to 120 degrees, or 5 to 90 degrees, or 1 to 60 degrees.

A powder composition comprises a plurality of thermoplastic particles comprising a thermoplastic composition, the particles having a D50 from 10 nanometer to 1 millimeter, and a plurality of comprising a flow promoter composition, and having a mean size from 1 nanometer to 500 micrometer, wherein the mean size is at least 50%, at least 60%, or 70-99.99% smaller than the D50, preferably 80 to 99% smaller than the D50, more preferably 95 to 98% smaller than the D50; wherein at least a portion of the plurality of flow promoter particles are surface-treated, and wherein a contact angle θ between a flat surface comprising the same flow promoter composition with the same surface treatment and a thermoplastic particle is at least 5% less, preferably 5 to 80% less, or 5 to 50% less, or 5 to 25% less than a contact angle θ between a flat surface of the same flow promoter composition without the surface treatment and a thermoplastic particle, each contact angle θ being determined at a coalescence temperature of the plurality of thermoplastic particles; or a time to coalescence of two thermoplastic particles and a surface-treated flow promoter particle is at least 5% less, preferably 5 to 80% less, or 5 to 50% less, or 5 to 25% less than the time to coalescence of two thermoplastic particles and the flow promoter particle without the surface treatment; or a shear stress to separate a first beam and a second beam comprising the thermoplastic composition, wherein one or more surface-treated flow promoter particles are disposed between the first and the second beams, is at least 5% greater, or 5 to 80% greater, or 5 to 50% greater than the shear stress to separate a first beam and a second beam comprising the thermoplastic composition having the flow promoter particles without the surface treatment; or a stress required to peel apart a first beam and a second beam comprising the thermoplastic composition, wherein one or more surface-treated flow promoter particles are disposed between the first and the second beams, is at least 5% greater, or 5 to 80% greater, or 5 to 50% greater than the stress required to peel apart a first beam and a second beam comprising the thermoplastic composition having the flow promoter particles without the surface treatment.

A powder composition comprises a plurality of thermoplastic particles comprising thermoplastic composition, the particles having a D50 from 10 nanometer to 1 millimeter, and a plurality of flow promoter particles comprising a flow promoter composition, and having a mean size from 1 nanometer to 500 micrometer, wherein the mean size is at least 50%, at least 60%, or 70-99.99% smaller than the D50, preferably 80 to 99% smaller than the D50, more preferably 95 to 98% smaller than the D50; wherein the amount of flow promoter particles is selected to provide an SAC of 0.05 to 0.95, preferably 0.10 to 0.60, more preferably 0.15 to 0.50, in accordance with the relationship:

$$SAC = \frac{m_g}{m_h}\left(\frac{\rho_h R_h^3}{4\rho_g(R_h + R_g)^2 R_g}\right)$$

wherein SAC is the surface area concentration of the flow promoter particles on the outer surface of the thermoplastic particles; $R_h$ is the average radius of the thermoplastic particles, $R_g$ is the average radius of the flow promoter particles, $\rho_h$ is the average density of the thermoplastic particles, $\rho_g$ is the average density of the flow promoter particles, $m_h$ is the mass value of the thermoplastic particles, and $m_g$ is the mass value of the flow promoter particles; and a contact angle θ between a flat surface comprising the flow promoter composition and a thermoplastic particle at a coalescence temperature of the plurality of thermoplastic particles is less than 150 degrees, or 10 to 120 degrees, or 5 to 90 degrees, or 1 to 60 degrees.

A method of preparing a three-dimensional article comprises powder bed fusing the powder composition to form a three-dimensional article.

A method of preparing a three-dimensional article comprises compression molding the powder composition to form the three-dimensional article.

A three-dimensional article made by the above method.

A method of preparing a powder coating on a substrate comprises applying a powder coating layer comprising the powder composition to a substrate; and consolidating the powder coating layer to form the powder coating.

A powder-coated article made the above method.

The above described and other features are exemplified by the following figures and detailed description.

BRIEF DESCRIPTION OF THE DRAWINGS

The following figures are of exemplary embodiments:

FIG. 1 shows a schematic illustration of thermoplastic particles separated by a flow promoter particle.

FIG. 2 shows a schematic illustration of thermoplastic particles and a wettable flow promoter particle during the coalescence phase of a sintering process.

FIG. 3 shows a schematic illustration of a shear test.

FIG. 4 shows a schematic illustration of a peel test.

FIG. 5 shows flowability as a function of surface area coverage for various flow promoting particles.

DETAILED DESCRIPTION

Figure 6:
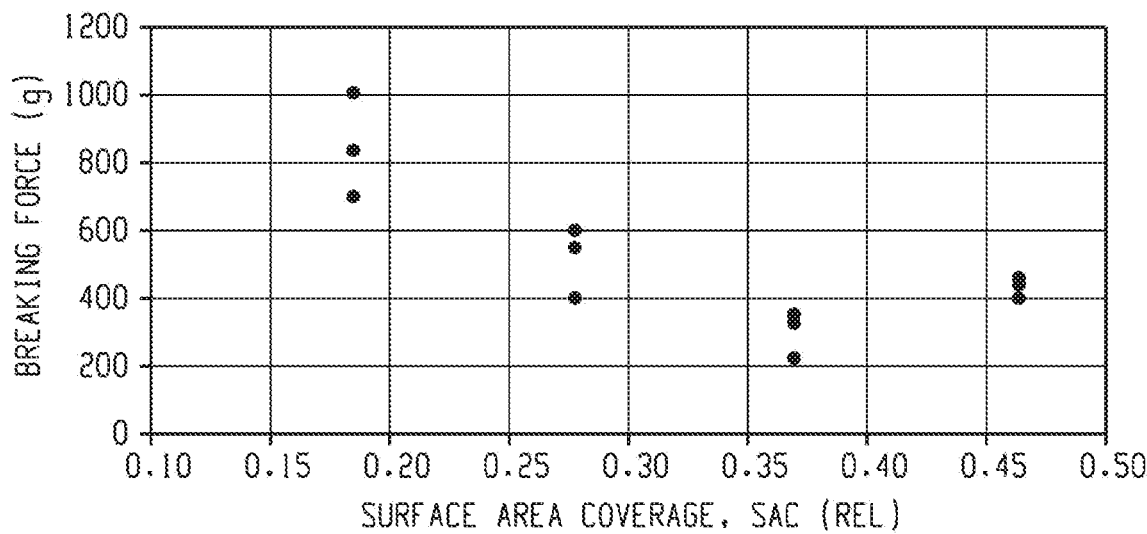
FIG. 6 shows the breaking force required in a 2-point beam test after partial sintering as a function of surface area coverage.

Disclosed herein are particulate thermoplastic compositions (also referred to herein as "powder compositions") having optimized flow properties, coalescent properties, or both. The present inventors have found that a good balance between flow and coalescence can be obtained using the methods described herein. Such powder compositions can advantageously be used in various additive manufacturing processes to provide three-dimensional articles with improved properties, as well as in other manufacturing processes such as powder coating and compression molding.

The powder compositions disclosed herein comprise a plurality of thermoplastic particles having an outer surface, and characterized by a D50 of 10 nanometer to 1 millimeter. As used herein, D50 refers to the particle diameter of the powder where 50 weight percent of the particles in the total distribution of the referenced sample have the noted particle diameter or smaller. Particle sizes can be measured by any suitable methods generally known to measure particle size by diameter. In some embodiments, the particle size is determined by laser diffraction. For example, particle size can be determined using a diffractometer such as the Mastersizer 3000 from Malvern.

The thermoplastic particles can generally be of any shape suitable for a desired application. In some embodiments, the particles are preferably spherical particles, and more preferably are spherical particles having a sphericity of 0.9 to 1. In some embodiments, the thermoplastic particles each have a maximum radius and a minimum radius of within 10%, or within 5%.

The thermoplastic particles comprise a thermoplastic polymer. As used herein, the term "thermoplastic" refers to a material that is plastic or deformable, melts to a liquid when heated, and freezes to a brittle, glassy state when cooled sufficiently. Thermoplastics are typically high molecular weight polymers. The thermoplastic polymer can be crystalline, semi-crystalline, or amorphous. The terms "amorphous" and "crystalline" as used herein have their usual meanings in the polymer art. For example, in an amorphous polymer the molecules can be oriented randomly and can be intertwined, and the polymer can have a glass-like, transparent appearance. In crystalline polymers, the polymer molecules can be aligned in ordered regions. In the polymer art, some types of crystalline polymers are sometimes referred to as semi-crystalline polymers. The term "crystalline" as used herein refers to both crystalline and semi-crystalline polymers. In some embodiments, a crystalline thermoplastic polymer can have a percent crystallinity of at least 20%, for example 20 to 80%, preferably, at least 25%, for example 25 to 60%, or 25 to 30%, more preferably at least 27%, for example 27 to 40%. The term "percent crystallinity" or "% crystallinity" as used herein, refers to the portion of the polymer that has a crystalline form. The percentage is based upon the total weight of the crystalline polymer. In some embodiments, the thermoplastic polymer is amorphous. In some embodiments, an amorphous thermoplastic polymer has less than 20% crystallinity, or less than 15% crystallinity, or less than 10% crystallinity, or less than 1% crystallinity, or 0% crystallinity. In some embodiments, the thermoplastic polymer can be an amorphous polymer that does not exhibit a melting point.

Examples of thermoplastic polymers that can be used include polyacetals (e.g., polyoxyethylene and polyoxymethylene), poly($C_{1-6}$ alkyl)acrylates, polyacrylamides, polyamides, (e.g., aliphatic polyamides, polyphthalamides, and polyaramides), polyamideimides, polyanhydrides, polyarylates, polyarylene ethers (e.g., polyphenylene ethers), polyarylene sulfides (e.g., polyphenylene sulfides), polyarylsulfones (e.g., polyphenylene sulfones), polybenzothiazoles, polybenzoxazoles, polycarbonates (including polycarbonate copolymers such as polycarbonate-siloxanes, polycarbonate-esters, and polycarbonate-ester-siloxanes), polyesters (e.g., polyethylene terephthalates, polybutylene terephthalates, polyarylates, and polyester copolymers such as polyester-ethers), polyetheretherketones, polyetherimides (including copolymers such as polyetherimide-siloxane copolymers), polyetherketoneketones, polyetherketones, polyethersulfones, polyimides (including copolymers such as polyimide-siloxane copolymers), poly($C_{1-6}$ alkyl)methacrylates, polymethacrylamides, polynorbornenes (including copolymers containing norbornenyl units), polyolefins (e.g., polyethylenes, polypropylenes, polytetrafluoroethylenes, and their copolymers, for example ethylene-alpha-olefin copolymers), polyoxadiazoles, polyoxymethylenes, polyphthalides, polysilazanes, polysiloxanes, polystyrenes (including copolymers such as acrylonitrile-butadiene-styrene (ABS) and methyl methacrylate-butadiene-styrene (MBS)), polysulfides, polysulfonamides, polysulfonates, polysulfones, polythioesters, polytriazines, polyureas, polyurethanes, polyvinyl alcohols, polyvinyl esters, polyvinyl ethers, polyvinyl halides, polyvinyl ketones, polyvinyl thioethers, polyvinylidene fluorides, or the like, or a combination comprising at least one of the foregoing thermoplastic polymers. Polyacetals, polyamides (nylons), polycarbonates, polyesters, polyetherimide, polyolefins, and polystyrene copolymers such as ABS, are especially useful in a wide variety of articles, have good processability, and are recyclable.

Useful polyamides include, but are not limited to, synthetic linear polyamides, e.g., Nylon-6,6; Nylon-6,9; Nylon-6,10; Nylon-6,12; Nylon-11; Nylon-12 and Nylon-4,6, preferably Nylon 6 and Nylon 6,6, or a combination comprising at least one of the foregoing. Polyurethanes that can be used include aliphatic, cycloaliphatic, aromatic, and polycyclic polyurethanes, including those described above. Also useful are poly($C_{1-6}$ alkyl)acrylates and poly($C_{1-6}$ alkyl)methacrylates, which include, for example, polymers of methyl acrylate, ethyl acrylate, acrylamide, methacrylic acid, methyl methacrylate, n-butyl acrylate, and ethyl acrylate, to name a few.

Representative examples of polyolefins are polyethylene, polypropylene, polybutylene, polymethylpentene (and co-polymers thereof), polynorbornene (and co-polymers thereof), poly 1-butene, poly(3-methylbutene), poly(4-methylpentene) and copolymers of ethylene with propylene, 1-butene, 1-hexene, 1-octene, 1-decene, 4-methyl-1-pentene and 1-octadecene. Representative combinations of polyolefins are combinations containing polyethylene and polypropylene, low-density polyethylene and high-density polyethylene, and polyethylene and olefin copolymers containing copolymerizable monomers, some of which are described above, e.g., ethylene and acrylic acid copolymers; ethyl and methyl acrylate copolymers; ethylene and ethyl acrylate copolymers; ethylene and vinyl acetate copolymers, ethylene, acrylic acid, and ethyl acrylate copolymers, and ethylene, acrylic acid, and vinyl acetate copolymers.

In some embodiments, the thermoplastic polymer comprises a polycarbonate, a polyetherimide, a polyimide, a polysulfone, a polyethersulfone, a polyphenylene sulfone, a polyarylene ether, a polyetherether ketone, a polyamide, or a combination comprising at least one of the foregoing, preferably a polycarbonate, a polyetherimide, or a combination comprising at least one of the foregoing.

In some embodiments, the thermoplastic polymer comprises a polyetherimide. Polyetherimides comprise more than 1, for example 10 to 1000, or 10 to 500, structural units of formula (1)

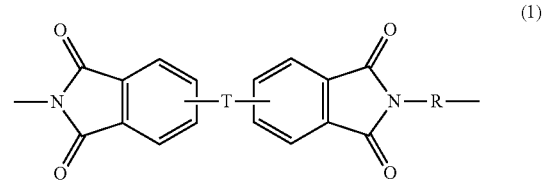

wherein each R is independently the same or different, and is a substituted or unsubstituted divalent organic group, such as a substituted or unsubstituted $C_{6-20}$ aromatic hydrocarbon group, a substituted or unsubstituted straight or branched chain $C_{2-20}$ alkylene group, a substituted or unsubstituted $C_{3-8}$ cycloalkylene group, or a halogenated derivative of any of the foregoing. In some embodiments, R is a divalent group of one or more of the following formulae (2)

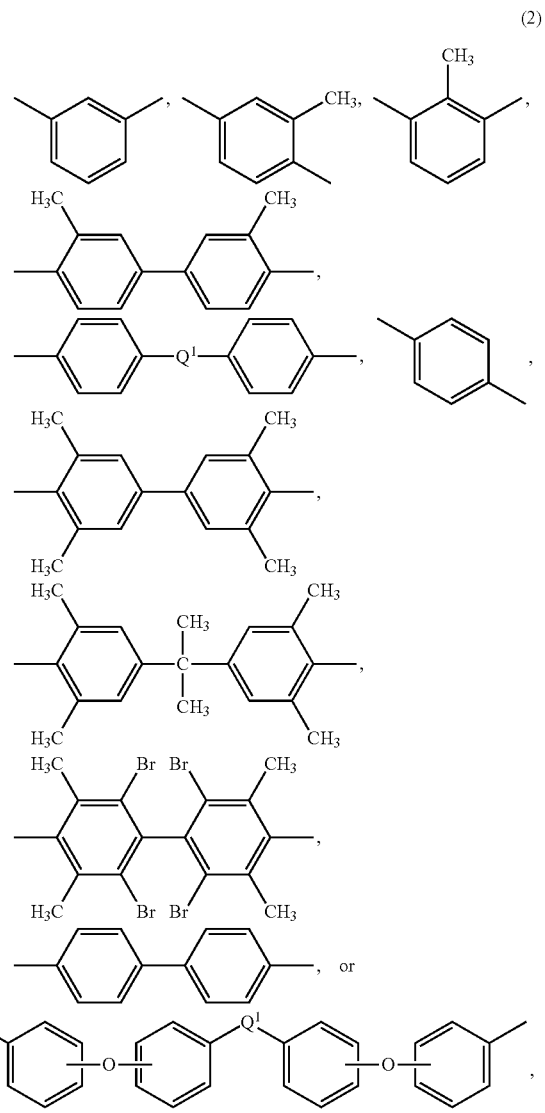

wherein $Q^1$ is —O—, —S—, —C(O)—, —$SO_2$—, —SO—, —P($R^a$)(=O)— wherein $R^a$ is a $C_{1-8}$ alkyl or $C_{6-12}$ aryl, —$C_yH_{2y}$— wherein y is an integer from 1 to 5 or a halogenated derivative thereof (which includes perfluoroalkylene groups), or —(C$_6$H$_{10}$)$_z$— wherein z is an integer from 1 to 4. In some embodiments R is m-phenylene, p-phenylene, or a diarylene sulfone, in particular bis(4,4'-phenylene)sulfone, bis(3,4'-phenylene)sulfone, bis(3,3'-phenylene)sulfone, or a combination comprising at least one of the foregoing. In some embodiments, at least 10 mole percent or at least 50 mole percent of the R groups contain sulfone groups, and in other embodiments no R groups contain sulfone groups.

Further in formula (1), T is —O— or a group of the formula —O—Z—O— wherein the divalent bonds of the —O—Z—O— group are in the 3,3', 3,4', 4,3', or the 4,4' positions, and Z is an aromatic C$_{6-24}$ monocyclic or polycyclic moiety optionally substituted with 1 to 6 C$_{1-8}$ alkyl groups, 1 to 8 halogen atoms, or a combination comprising at least one of the foregoing, provided that the valence of Z is not exceeded. Exemplary groups Z include groups of formula (3)

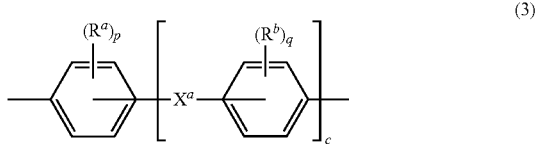

(3)

wherein R$^a$ and R$^b$ are each independently the same or different, and are a halogen atom or a monovalent C$_{1-6}$ alkyl group, for example; p and q are each independently integers of 0 to 4; c is 0 to 4; and X$^a$ is a bridging group connecting the hydroxy-substituted aromatic groups, where the bridging group and the hydroxy substituent of each C$_6$ arylene group are disposed ortho, meta, or para (specifically para) to each other on the C$_6$ arylene group. The bridging group X$^a$ can be a single bond, —O—, —S—, —S(O)—, —S(O)$_2$—, —C(O)—, or a C$_{1-18}$ organic bridging group. The C$_{1-18}$ organic bridging group can be cyclic or acyclic, aromatic or non-aromatic, and can further comprise heteroatoms such as halogens, oxygen, nitrogen, sulfur, silicon, or phosphorous. The C$_{1-18}$ organic group can be disposed such that the C$_6$ arylene groups connected thereto are each connected to a common alkylidene carbon or to different carbons of the C$_{1-18}$ organic bridging group. A specific example of a group Z is a divalent group of formula (3a)

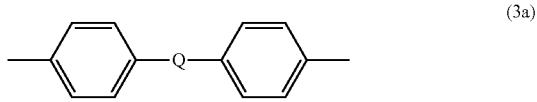

(3a)

wherein Q is —O—, —S—, —C(O)—, —SO$_2$—, —SO—, —P(R$^a$)(=O)— wherein R$^a$ is a C$_{1-8}$ alkyl or C$_{6-12}$ aryl, or —C$_y$H$_{2y}$— wherein y is an integer from 1 to 5 or a halogenated derivative thereof (including a perfluoroalkylene group). In a specific embodiment Z is a derived from bisphenol A, such that Q in formula (3a) is 2,2-isopropylidene.

In an embodiment in formula (1), R is m-phenylene, p-phenylene, or a combination comprising at least one of the foregoing, and T is —O—Z—O— wherein Z is a divalent group of formula (3a). Alternatively, R is m-phenylene, p-phenylene, or a combination comprising at least one of the foregoing, and T is —O—Z—O— wherein Z is a divalent group of formula (3a) and Q is 2,2-isopropylidene. Alternatively, the polyetherimide can be a copolymer optionally comprising additional structural polyetherimide units of formula (1) wherein at least 50 mole percent (mol %) of the R groups are bis(4,4'-phenylene)sulfone, bis(3,4'-phenylene)sulfone, bis(3,3'-phenylene)sulfone, or a combination comprising at least one of the foregoing and the remaining R groups are p-phenylene, m-phenylene, or a combination comprising at least one of the foregoing; and Z is 2,2-(4-phenylene)isopropylidene, i.e., a bisphenol A moiety.

In some embodiments, the polyetherimide is a copolymer that optionally comprises additional structural imide units that are not polyetherimide units, for example imide units of the formula

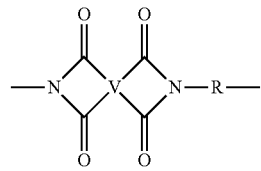

wherein R is as described in formula (1) and each V is the same or different, and is a substituted or unsubstituted C$_{6-20}$ aromatic hydrocarbon group, for example a tetravalent linker of the formulas

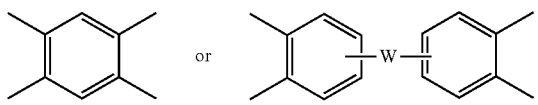

wherein W is a single bond, —O—, —S—, —C(O)—, —SO$_2$—, —SO—, —P(R$^a$)(=O)— wherein R$^a$ is a C$_{1-8}$ alkyl or C$_{6-12}$ aryl, or —C$_y$H$_{2y}$— wherein y is an integer from 1 to 5 or a halogenated derivative thereof (which includes perfluoroalkylene groups). These additional structural imide units preferably comprise less than 20 mol % of the total number of units, and more preferably can be present in amounts of 0 to 10 mol % of the total number of units, or 0 to 5 mol % of the total number of units, or 0 to 2 mole % of the total number of units. In some embodiments, no additional imide units are present in the polyetherimide.

The polyetherimide can be prepared by any of the methods well known to those skilled in the art, including the reaction of an aromatic bis(ether anhydride) of formula (5) or a chemical equivalent thereof, with an organic diamine of formula (6)

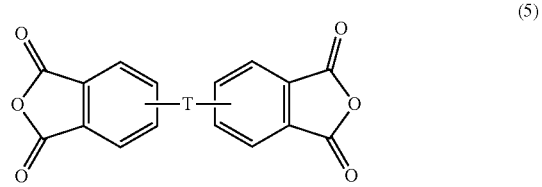

(5)

H$_2$N—R—NH$_2$ (6)

wherein T and R are defined as described above. Copolymers of the polyetherimides can be manufactured using a combination of an aromatic bis(ether anhydride) of formula (5) and an additional bis(anhydride) that is not a bis(ether anhydride), for example pyromellitic dianhydride or bis(3,4-dicarboxyphenyl) sulfone dianhydride.

Illustrative examples of aromatic bis(ether anhydride)s include 2,2-bis[4-(3,4-dicarboxyphenoxy)phenyl]propane dianhydride (also known as bisphenol A dianhydride or BPADA), 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride; 4,4'-(hexafluoroisopropylidene)diphthalic anhydride; and 4-(2,3-dicarboxyphenoxy)-4'-(3,4-dicarboxyphenoxy)diphenyl sulfone dianhydride. A combination of different aromatic bis(ether anhydride)s can be used.

Examples of organic diamines include 1,4-butanediamine, 1,5-pentanediamine, 1,6-hexanediamine, 1,7-heptanediamine, 1,8-octanediamine, 1,9-nonanediamine, 1,10-decanediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl) sulfide, bis-(4-aminophenyl) sulfone (also known as 4,4'-diaminodiphenyl sulfone (DDS)), and bis(4-aminophenyl) ether. Any regioisomer of the foregoing compounds can be used. $C_{1-4}$ alkylated or poly($C_{1-4}$)alkylated derivatives of any of the foregoing can be used, for example a polymethylated 1,6-hexanediamine. Combinations of these compounds can also be used. In some embodiments the organic diamine is m-phenylenediamine, p-phenylenediamine, 4,4'-diaminodiphenyl sulfone, 3,4'-diaminodiphenyl sulfone, 3,3'-diaminodiphenyl sulfone, or a combination comprising at least one of the foregoing.

The polyetherimides can have a melt index of 0.1 to 10 grams per minute (g/min), as measured by American Society for Testing Materials (ASTM) D1238 at 340 to 370° C., using a 6.7 kilogram (kg) weight. In some embodiments, the polyetherimide has a weight average molecular weight (Mw) of 1,000 to 150,000 grams/mole (Dalton), as measured by gel permeation chromatography, using polystyrene standards. In some embodiments the polyetherimide has an Mw of 10,000 to 80,000 Daltons. Such polyetherimides typically have an intrinsic viscosity greater than 0.2 deciliters per gram (dl/g), or, more specifically, 0.35 to 0.7 dl/g as measured in m-cresol at 25° C.

In some embodiments, the thermoplastic polymer comprises a polycarbonate. "Polycarbonate" as used herein means a polymer or copolymer having repeating structural carbonate units of formula (7)

(7)

wherein at least 60 percent of the total number of $R^1$ groups are aromatic, or each $R^1$ contains at least one $C_{6-30}$ aromatic group. Specifically, each $R^1$ can be derived from a dihydroxy compound such as an aromatic dihydroxy compound of formula (8) or a bisphenol of formula (9).

(8)

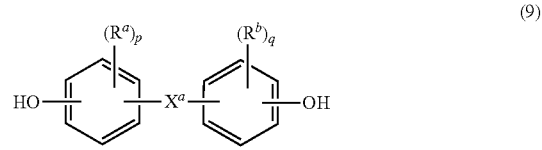

(9)

In formula (8), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (9), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen. In an embodiment, p and q is each 0, or p and q is each 1, and $R^a$ and $R^b$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

Some illustrative examples of dihydroxy compounds that can be used are described, for example, in WO 2013/175448 A1, US 2014/0295363, and WO 2014/072923. Specific dihydroxy compounds include resorcinol, 2,2-bis(4-hydroxyphenyl) propane ("bisphenol A" or "BPA"), 3,3-bis(4- hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane, and 1,1-bis(4-hydroxy-3-methylphenyl)-3,3,5-trimethylcyclohexane (isophorone bisphenol).

In addition to the plurality of thermoplastic particles, the powder compositions also include a plurality of flow promoter particles having an outer surface, and characterized by a mean size from 1 nanometer to 500 micrometer. As used herein, "mean size" refers to the sum of the size measurements of all measurable particles measured divided by the total number of particles measured. The mean particle size can be measured by methods that are generally known, for example the mean size of the particles can be determined using the Brunauer Emmett and Teller ("BET") technique. The mean size is at least 50%, at least 60%, or 70-99.99% smaller than the D50 of the thermoplastic particles, preferably 80 to 99.99% smaller than the D50, more preferably 99.95 to 99.98% smaller than the D50.

The flow promoter can be a metal oxide, a mixed metal oxide, or a combination comprising at least one of the foregoing. In some embodiments, the flow promoter preferably comprises fumed silica, fumed aluminum oxide, a hydrated silica, amorphous alumina, a glassy silica, a glassy phosphate, a glassy borate, a glassy oxide, titania, talc, mica, a fumed silica, kaolin, attapulgite, calcium silicate, alumina, magnesium silicate, or a combination comprising at least one of the foregoing. In an embodiment, the flow promoter more preferably comprises fumed silica.

In previous powder compositions, the amount of flow promoter present is often described in terms of a weight percent based on the weight of the powder composition. The present inventors have discovered that the important descriptive parameter for the amount of a flow promoter in a powder composition is the relative surface area coverage (SAC) of a thermoplastic particle by the flow promoter particles.

Therefore in an embodiment, the amount of flow promoter particles is selected to provide a SAC of 0.05 to 0.95, preferably 0.1 to 0.60, more preferably 0.15 to 0.5 in accordance with the relationship $$SAC = \frac{m_g}{m_h}\left(\frac{\rho_h R_h^3}{4\rho_g(R_h+R_g)^2 R_g}\right)$$

wherein SAC is the surface area concentration of the flow promoter particles on the outer surface of the thermoplastic particles; $R_h$ is the average radius of the thermoplastic particles; $R_g$ is the average radius of the flow promoter particles; $\rho_h$ is the average density of the thermoplastic particles; $\rho_g$ is the average density of the flow promoter particles; $m_h$ is the mass value of the thermoplastic particles; and $m_g$ is the mass value of the flow promoter particles.

The flowability of a powder composition can be measured by a ring shear tester, and can be defined as $$ff_c = \sigma_1/\sigma_c$$

where $\sigma_1$ is the consolidation stress, and $\sigma_c$ is the unconfined yield strength. Expressing the amount of flow promoting particles as a relative surface area coverage as opposed to a weight percent allows the system to be scaled independently to a wide range of sizes of each particle type, whereas such a scaling is not possible based on a weight percent description. Furthermore, defining the amount of flow promoter as a relative SAC can also be advantageous because the presence of the flow promoter in an article prepared from the powder composition is not desirable for all applications, and in some cases, can negatively impact the physical properties of the article.

In some embodiments, the amount of flow promoter particles is selected to provide a SAC of 0.05 to 0.95, preferably 0.1 to 0.60, more preferably 0.15 to 0.5, and the resulting powder composition can have a flowability of 1 to 10, or 3 to 9, or 4 to 8.

Another embodiment is directed to optimizing the coalescence process. The present inventors have discovered that the surface of the flow promoting particles can be chemically modified so as to tune the wettability of the particle. Careful selection of surface modification of the flow promoting particles can encourage wetting of the nanoparticle and accelerate coalescence. For example, as shown in FIG. 1, two thermoplastic particles can be separated by a flow promoter particle. FIG. 2 shows the same thermoplastic particles and flow promoter particle, where the local temperature is above the glass transition temperature (Tg) of the thermoplastic particles. The particles can coalesce above the Tg, and the flow promoter particles can be wetted by the molten thermoplastic particles. Without wishing to be bound by theory, it is believed that the flow promoter particle can facilitate the coalescence of the thermoplastic particles when the flow promoter particle has a surface functionalization that provides the improved wettability of the flow promoter particle.

Thus in an embodiment, a powder composition comprises a plurality of thermoplastic polymer particles having a D50 from 10 nanometer to 1 millimeter and a plurality of flow promoter particles comprising a flow promoter composition, and having a mean size from 1 nanometer to 500 micrometer, wherein the mean size is at least 50% smaller than the D50 of the large particles, or at least 60% smaller, or 70-99.99% smaller. In some embodiments the mean size is 80 to 99.99% smaller than the D50 of the larger particles, more preferably 99.95 to 99.98% smaller than the D50. The contact angle θ between a flat surface comprising the flow promoter composition and a thermoplastic particle at a coalescence temperature of the plurality of thermoplastic particles is less than 150 degrees, or 10 to 120 degrees, or 5 to 90 degrees, or 1 to 60 degrees.

In another embodiment, the flow promoting composition is selected to provide a contact angle θ between a flat surface comprising the flow promoter composition and a thermoplastic particle at the coalescence temperature of the plurality of thermoplastic particles that is at least 5% less than the contact angle θ of a comparative surface and the thermoplastic particle at the coalescence temperature of the plurality of thermoplastic particles, wherein the comparative flat surface comprises silica, alumina, or titania, preferably silica, each independently having a purity of 99.99% and a surface roughness within 10% of the surface roughness of the flat surface comprising the flow promoter composition.

In yet another embodiment, a powder composition comprises a plurality of thermoplastic polymer particles having a D50 from 10 nanometer to 1 millimeter and a plurality of flow promoter particles comprising a flow promoter composition, and having a mean size from 1 nanometer to 500 micrometer, wherein the mean size is at least 50%, at least 60%, or 70-99.99% smaller than the D50, preferably 80 to 99.99% smaller than the D50, more preferably 99.95 to 99.98% smaller than the D50. At least a portion of the plurality of flow promoter particles are surface treated. The contact angle θ between a flat surface comprising the same flow promoter composition with the same surface treatment and a thermoplastic particle is at least 5% less, preferably 5 to 80% less, or 5 to 50% less, or 5 to 25% less than a contact angle θ between a flat surface of the same flow promoter composition without the surface treatment and a thermoplastic particle, each contact angle θ being determined at a coalescence temperature of the plurality of thermoplastic particles. Further, the time to coalescence of two thermoplastic particles and a surface-treated flow promoter particle is at least 5% less, preferably 5 to 80% less, or 5 to 50% less, or 5 to 25% less than the time to coalescence of two thermoplastic particles and the flow promoter particle without the surface treatment. Improved wettability can also be measured by comparing the shear stress to separate two beams comprising the thermoplastic composition separated by one or more flow promoter particles, with and without surface treatment. As shown in FIG. 3, two or three beams separated by flow promoter particles can be annealed for a desired time under a fixed normal stress at a temperature that is greater than the Tg (e.g., at the coalescence temperature). Subsequent to annealing, the beams can be cooled to 25° C., and shear stress required to separate the beams can be measured. Surface treated flow promoter particles can provide an increase in the shear stress relative to untreated flow promoter particles. Thus, in some embodiments, the shear stress to separate a first beam and a second beam comprising the thermoplastic composition, wherein one or more surface-treated flow promoter particles are disposed between the first and the second beams, is at least 5% greater, or 5 to 80% greater, or 5 to 50% greater than the shear stress to separate a first beam and a second beam comprising the thermoplastic composition having the flow promoter particles without the surface treatment. In another embodiment, the relative wettability of the particles can be assessed by an adhesion test. As shown in FIG. 4, two beams separated by flow promoter particles can be annealed for a desired time under a fixed normal stress at a temperature that is greater than the Tg (e.g., at the coalescence temperature). Subsequent to annealing, the beams can be cooled to 25° C., the two beams can be peeled apart, and the stress required to peel apart the beams can be measured. Surface treated flow promoter particles can provide an increase in the stress required to peel apart the beams relative to untreated flow promoter particles. In some embodiments, the stress required to peel apart a first beam and a second beam comprising the thermoplastic composition, wherein one or more surface-treated flow promoter particles are disposed between the first and the second beams, is at least 5% greater, or 5 to 80% greater, or 5 to 50% greater than the stress required to peel apart a first beam and a second beam comprising the thermoplastic composition having the flow promoter particles without the surface treatment.

In some embodiments, the coalescence temperature of the thermoplastic particles is at least 10° C. above the glass transition temperature, for example 10 to 25° C. above the glass transition temperature (Tg) of the thermoplastic polymer composition. Within this range, the coalescence temperature can preferably be at least 10° C., or at least 12° C., or at least 15° C., or at least 18° C., or at least 20° C., or at least 22° C. above the Tg of the thermoplastic polymer composition. In some embodiments, the coalescence temperature is preferably 10 to 15° C. above the Tg of the thermoplastic polymer composition. In some embodiments, the coalescence temperature is 15° C. above the Tg of the thermoplastic polymer composition. In some embodiments, the coalescence temperature is at least 1° C. above the melting temperature Tm of the thermoplastic composition, for example 1 to 15° C. above the Tm.

In another embodiment, a powder composition comprises a plurality of thermoplastic polymer particles having a D50 from 10 nanometer to 1 millimeter and a plurality of flow promoter particles comprising a flow promoter composition, and having a mean size from 1 nanometer to 500 micrometer, wherein the mean size is at least 50%, at least 60%, or 70-99.99% smaller than the D50, preferably 80 to 99.99% smaller than the D50, more preferably 99.95 to 99.98% smaller than the D50. The amount of flow promoter particles is selected to provide a SAC of 0.05 to 0.95, preferably 0.1 to 0.6, more preferably 0.15 to 0.5 in accordance with the relationship $$SAC = \frac{m_g}{m_h}\left(\frac{\rho_h R_h^3}{4\rho_g(R_h+R_g)^2 R_g}\right)$$

wherein SAC is the surface area concentration of the flow promoter particles on the outer surface of the thermoplastic particles; $R_h$ is the average radius of the thermoplastic particles; $R_g$ is the average radius of the flow promoter particles; $\rho_h$ is the average density of the thermoplastic particles; $\rho_g$ is the average density of the flow promoter particles; $m_h$ is the mass value of the thermoplastic particles; and $m_g$ is the mass value of the flow promoter particles. The contact angle θ between a flat surface comprising the flow promoter composition and a thermoplastic particle at a coalescence temperature of the plurality of thermoplastic particles is less than 150 degrees, or 10 to 120 degrees, or 5 to 90 degrees, or 1 to 60 degrees.

In some embodiments, at least a portion of the plurality of flow promoter particles of any of the above-described powder compositions comprise a surface treatment effective to render the surfaces of the flow promoter particles more hydrophobic than the untreated surfaces. The surface treatment can include surface derivatization, for example with an organic reagent, polymer encapsulation, and the like, or a combination comprising at least one of the foregoing. Examples of surface treatments can include $C_{1-12}$ alkyl groups, $C_{1-12}$ alkylsilyl groups, and combinations comprising at least one of the foregoing, preferably, $C_{1-6}$ alkyl groups and combinations thereof, more preferably, $C_{1-4}$ alkyl groups and combinations thereof; even more preferably, methyl, ethyl, and combinations thereof, most preferably, methyl. The surface treatment can impart at least a degree of hydrophobicity to the flow promoter particles.

In some embodiments, the thermoplastic particles have a D50 of 10 nanometer to 500 micrometers, or 10 nanometers to 200 micrometers, or 25 nanometers to 50 micrometers, and the flow promoter particles have a mean size of 1 nanometer to 200 micrometers, 1 nanometer to 500 nanometers, or 10 nanometers to 50 nanometers.

In some embodiments, the thermoplastic particles have a D50 of 10 nanometer to 500 micrometers, or 1 to 300 micrometers, or 10 to 200 micrometers, and the flow promoter particles have a mean size of 1 nanometer to 200 micrometers, 1 nanometer to 500 nanometers, or 10 nanometers to 50 nanometers.

In some embodiments, the thermoplastic particles have a D50 of 10 nanometer to 600 micrometers, or 1 to 500 micrometers, or 10 to 300 micrometers, and the flow promoter particles have a mean size of 1 nanometer to 200 micrometers, 1 nanometer to 500 nanometers, or 10 nanometers to 50 nanometers.

In some embodiments, the powder composition can further comprise one or more optional components. An optional component is present in a sufficient amount to perform its intended function without adversely affecting the powder composition or an article prepared therefrom. For example, the one or more optional components can comprise a particulate inorganic filler (such as glass, ceramic, or metal, e.g., ceramic particles), a particulate organic filler (such as carbon or a crosslinked polymer), conductive filler (such as graphite or single-walled or multi-walled carbon nanotubes), an inorganic filler, organic fiber, inorganic fiber, conductive ink, antioxidant, heat stabilizer, light stabilizer, ultraviolet (UV) light stabilizer, UV absorbing additive, NIR absorbing additive, IR absorbing additive, laser marking dye, plasticizer, lubricant, release agent (such as a mold release agent), antistatic agent, anti-fog agent, antimicrobial agent, colorant (e.g, a dye or pigment), surface effect additive, radiation stabilizer, flame retardant, anti-drip agent (e.g., a PTFE-encapsulated styrene-acrylonitrile copolymer (TSAN)), a fragrance, or a combination comprising at least one of the foregoing, preferably a colorant.

In an embodiment, the powder composition comprises a colorant, for example a pigment or a dye, like carbon black, to impart a desired color to the article of manufacture. The coloring agent is not limited, as long as the coloring agent does not adversely affect the composition or an article prepared therefrom, and is sufficiently stable to retain its color under conditions of the laser sintering process and during exposure to the laser.

When present, each individual optional component can be included in the powder composition in an amount of 0.01 to 30 weight percent, based on the total weight of the powder composition. The total amount of all optional components in the powder composition ranges from 0 up to 30 weight percent, based on the total weight of the powder composition.

The powder compositions described herein can be useful for a variety of applications, including forming three dimensional articles or powder coatings. Accordingly, another aspect of the present disclosure includes a method of preparing a powder coating, comprising applying a powder coating layer comprising the above-described powder composition to a substrate, and consolidating the powder coating layer to form the powder coating. Applying the powder coating layer can be by any method that is generally known, for example by scattering, sprinkling, spraying, thermal or flame spraying, electrostatic spraying, or by fluidized bed coating methods. In some embodiments, the particles or the substrate can be given an electrostatic charge so that they will adhere well. Examples of substrates that can be coated include, but are not limited to, glass, plastic, wood, metal, ceramics, or a combination comprising at least one of the foregoing substrates. These substrates can be used as part of any number of different articles. Consolidating the powder coating layer to form the powder coating can include applying heat or pressure or both to coalesce or fuse the particles to form the powder coating. Heating can be achieved at a temperature above the melting range of the powder composition, for example in a temperature range of 80 to 220° C. The temperature is dependent on the type of thermoplastic particles. The heating can be by gas or air heating, or IR or NIR, as known in the art. A powder-coated article made by the above method represents another aspect of the present disclosure.

In another embodiment, a method of preparing a three-dimensional article includes placing the powder compositions as described above into a mold; and compression molding the powder composition under heat and pressure effective to form the three-dimensional object.

In yet another embodiment, the powder compositions can be fusible powder compositions, and therefore can be particularly useful in a powder bed fusing process. The term "powder bed fusing" or "powder bed fusion" as used herein refers to processes wherein the powder is selectively sintered or melted and fused, layer-by-layer to provide a three-dimensional article. Sintering can result in articles having a density of less than about 90% of the density of the solid powder composition, whereas melting can provide objects having a density of 90% to 100% of the solid powder composition. Powder bed fusing or powder bed fusion further includes all laser sintering and all selective laser sintering processes as well as other powder bed fusing technologies as defined by ASTM F2792-12a. For example, sintering of the powder composition can be accomplished via application of electromagnetic radiation other than that produced by a laser, with the selectivity of the sintering achieved, for example, through selective application of inhibitors, absorbers, susceptors, or the electromagnetic radiation (e.g., through use of masks or directed laser beams). Any other suitable source of electromagnetic radiation can be used, including, for example, infrared radiation sources, microwave generators, lasers, radiative heaters, lamps, or a combination thereof. In some embodiments, selective mask sintering ("SMS") techniques can be used to produce three-dimensional articles of the invention. For further discussion of SMS processes, see for example U.S. Pat. No. 6,531,086 which describes an SMS machine in which a shielding mask is used to selectively block infrared radiation, resulting in the selective irradiation of a portion of a powder layer. If using an SMS process to produce articles from powder compositions of the invention, it can be desirable to include one or more materials in the powder composition that enhance the infrared absorption properties of the powder composition. For example, the powder composition can include one or more heat absorbers or dark-colored materials (e.g., carbon black, carbon nanotubes, or carbon fibers).

Powder bed fused (e.g., laser sintered) articles can include a plurality of overlying and adherent sintered layers that include a polymeric matrix which, in some embodiments, have reinforcement particles dispersed throughout the polymeric matrix. "Plurality" as used in the context of additive manufacturing includes 5 or more layers, or 20 or more layers. The maximum number of layers can vary greatly, determined, for example, by considerations such as the size of the article being manufactured, the technique used, the capabilities of the equipment used, and the level of detail desired in the final article. For example, 5 to 100,000 layers can be formed, or 20 to 50,000 layers can be formed, or 50 to 50,000 layers can be formed. As used herein, "layer" is a term of convenience that includes any shape, regular or irregular, having at least a predetermined thickness. In some embodiments, the size and configuration two dimensions are predetermined, and in some embodiments, the size and shape of all three-dimensions of the layer is predetermined. The thickness of each layer can vary widely depending on the additive manufacturing method. In some embodiments the thickness of each layer as formed differs from a previous or subsequent layer. In some embodiments, the thickness of each layer is the same. In some embodiments the thickness of each layer as formed is 0.5 millimeters (mm) to 5 mm. In some embodiments, the fused layers of powder bed fused articles can be of any thickness suitable for selective laser sintered processing. For example, the individual layers can be each, on average, preferably at least 50 micrometers (μm) thick, more preferably at least 80 μm thick, and even more preferably at least 100 μm thick. In a preferred embodiment, the plurality of sintered layers are each, on average, preferably less than 500 μm thick, more preferably less than 300 μm thick, and even more preferably less than 200 μm thick. Thus, the individual layers for some embodiments can be 50 to 500 μm, 80 to 300 μm, or 100 to 200 μm thick. Three-dimensional articles produced from the powder compositions using a layer-by-layer powder bed fusing processes other than selective laser sintering can have layer thicknesses that are the same or different from those described above.

Laser sintering processes are sufficiently well known, and are based on the selective sintering of polymer particles, where layers of polymer particles are briefly exposed to laser light and the polymer particles exposed to the laser light are thus bonded to one another. Successive sintering of layers of polymer particles produces three-dimensional objects. Details concerning the selective laser sintering process are found, by way of example, in U.S. Pat. No. 6,136,948 and WO 96/06881.

An example of a SLS system for fabricating a three-dimensional article from the powder composition can be described as follows. One thin layer of powder composition comprising the powder composition is spread over the sintering chamber. The laser beam traces the computer-controlled pattern, corresponding to the cross-section slice of the CAD model, to melt the powder selectively which has been preheated to slightly, preferably below its melting temperature. After one layer of powder is sintered, the powder bed piston is lowered with a predetermined increment (typically 100 μm), and another layer of powder is spread over the previous sintered layer by a roller. The process then repeats as the laser melts and fuses each successive layer to the previous layer until the entire article is completed.

Another aspect of the present disclosure includes three-dimensional articles made by powder bed fusing the powder compositions. After a layer-by-layer manufacture of an article of manufacture, the article can exhibit excellent resolution, durability, and strength. These articles of manufacture can have a wide variety of uses, including as prototypes and as end products as well as molds for end products.

EXAMPLES

A powder comprising polyetherimide particles was used for the following examples. The polyetherimide was obtained as ULTEM 1000 from SABIC.

Flowability (ff$_c$) of the polymer powder as a function of surface area coverage (SAC) was measured for various flow promoting nanoparticles. The flow promoting particles tested included aluminum oxide as an exemplary metal oxide (obtained as AEROXIDE AluC from Evonik Industries), fumed silica having a specific surface area of 150 m$^2$/g (obtained as AEROSIL 150 from Evonik Industries), fumed silica having a specific surface area of 200 m$^2$/g (obtained as AEROSIL 200 from Evonik Industries), and fumed silica having hydrophobic surface modification including dimethyldichlorosilane treatment (DDS) (obtained as AEROSIL R 972 and AEROSIL R 974 from Evonik Industries), and methacrylsilane treatment (obtained as AEROSIL R 7200 from Evonik Industries). The results of the flowability testing are shown in FIG. 5. As shown in FIG. 5, the increase in flowability with increase in SAC was observed to plateau or decrease in some cases by 50% SAC. The hydrophobic methacrylsilane treated fumed silica (R7200) exhibited the best performance among the flow promoters tested.

In order to assess the ability of the flow promoter particles to influence the coalescence of the powder particles, a partial sintering test was used. In this test, powder samples with varying amounts of flow promoters were pressed into a bar shape with light pressure. The bar was then lightly sintered in an oven for a time insufficient to achieve complete sintering or any gross melting of the particles. This resulted in the powder particles becoming only lightly sintered, and subsequent measurement of the force required to break the bar in a 2-point beam bending test was used to assess the flow promoter influence on coalescence of the powder particles.

FIG. 6 shows the results of the bar sintering test using AluC as the flow promoter. As shown in FIG. 6, as the surface area coverage of the host powder particles by the nanoparticles increases, the breaking strength is observed to decrease. No nanoparticles were observed to increase the sintering performance.

Figure 7:
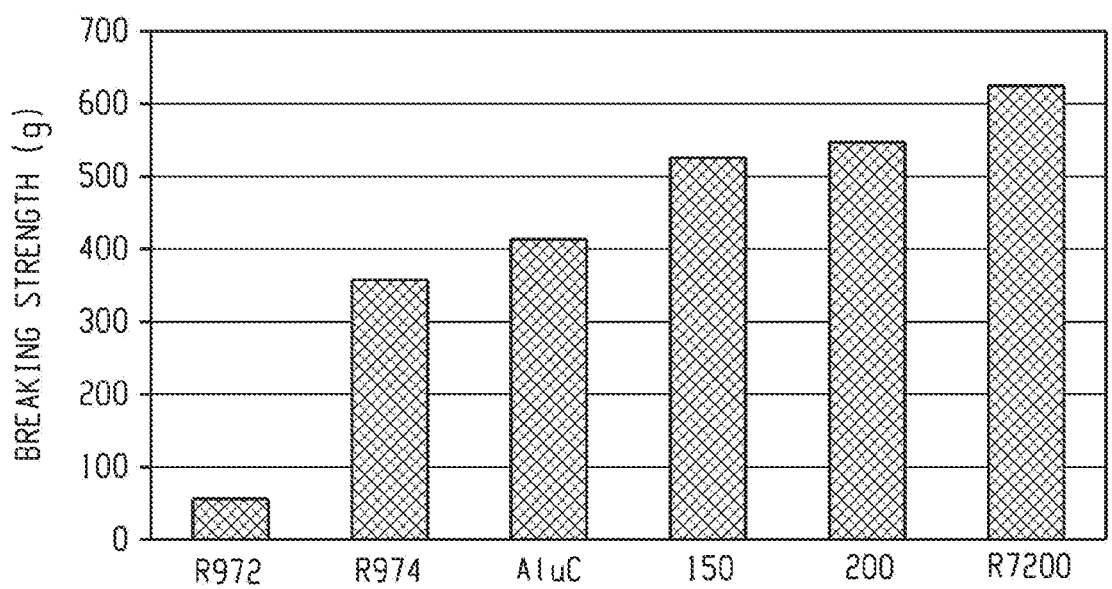
FIG. 7 shows the breaking force for various flow promoting particles at a fixed surface area coverage.

FIG. 7 shows the sintering performance for all of the above described flow promoters at a SAC of 0.4%. As shown in FIG. 7, breaking strengths of greater than 300 g (e.g., 300 to 700 g) were observed for the various flow promoters tested. Fumed silica having specific surface areas of both 150 and 200 m$^2$/g and the hydrophobic R7200 flow promoter exhibit breaking strengths of greater than 500 g (e.g., 500 to 700 g). Thus the sintering results shown suggest good coalescence between the host particles is achieved in the presence of the flow promoting particles.

The compositions, methods, and articles disclosed herein are further illustrated by the following embodiments, which are non-limiting.

Embodiment 1: A powder composition, comprising: a plurality of thermoplastic particles having an outer surface, and characterized by a D50 from 10 nanometer to 1 millimeter, and a plurality of flow promoter particles having an outer surface, and characterized by a mean size from 1 nanometer to 500 micrometer, wherein the mean size is at least 50%, at least 60%, or 70-99.99% smaller than the D50, preferably 80 to 99.99% smaller than the D50, more preferably 99.95 to 99.98% smaller than the D50; wherein the amount of flow promoter particles is selected to provide an SAC of 0.05 to 0.95, preferably 0.10 to 0.60, more preferably 0.15 to 0.50, in accordance with the relationship:

$$SAC = \frac{m_g}{m_h}\left(\frac{\rho_h R_h^3}{4\rho_g(R_h+R_g)^2 R_g}\right)$$

wherein SAC is the surface area concentration of the flow promoter particles on the outer surface of the thermoplastic particles; $R_h$ is the average radius of the thermoplastic particles, $R_g$ is the average radius of the flow promoter particles, $\rho_h$ is the average density of the thermoplastic particles, $\rho_g$ is the average density of the flow promoter particles, $m_h$ is the mass value of the thermoplastic particles, and $m_g$ is the mass value of the flow promoter particles.

Embodiment 2: A powder composition, comprising: a plurality of thermoplastic particles comprising thermoplastic composition, the particles having a D50 from 10 nanometer to 1 millimeter, and a plurality of flow promoter particles comprising a flow promoter composition, and having a mean size from 1 nanometer to 500 micrometer, wherein the mean size is at least 50%, at least 60%, or 70-99.99% smaller than the D50, preferably 80 to 99.99% smaller than the D50, more preferably 99.95 to 99.98% smaller than the D50; and wherein a contact angle θ between a flat surface comprising the flow promoter composition and a thermoplastic particle at a coalescence temperature of the plurality of thermoplastic particles is less than 150 degrees, or 10 to 120 degrees, or 5 to 90 degrees, or 1 to 60 degrees.

Embodiment 3: The powder composition of embodiment 2, wherein the flow promoting composition is selected to provide a contact angle θ between a flat surface comprising the flow promoter composition and a thermoplastic particle at the coalescence temperature of the plurality of thermoplastic particles that is at least 5% less than the contact angle θ of at least one comparative surface and the thermoplastic particle at the coalescence temperature of the plurality of thermoplastic particles, wherein the at least one comparative flat surface comprises silica, alumina, or titania, each independently having a purity of 99.99% and a surface roughness within 10% of the surface roughness of the flow promoter flat surface.

Embodiment 4: A powder composition, comprising: a plurality of thermoplastic particles comprising a thermoplastic composition, the particles having a D50 from 10 nanometer to 1 millimeter, and a plurality of comprising a flow promoter composition, and having a mean size from 1 nanometer to 500 micrometer, wherein the mean size is at least 50%, at least 60%, or 70-99.99% smaller than the D50, preferably 80 to 99.99% smaller than the D50, more preferably 99.95 to 99.98% smaller than the D50; wherein at least a portion of the plurality of flow promoter particles are surface-treated, and wherein a contact angle θ between a flat surface comprising the same flow promoter composition with the same surface treatment and a thermoplastic particle is at least 5% less, preferably 5 to 80% less, or 5 to 50% less, or 5 to 25% less than a contact angle θ between a flat surface of the same flow promoter composition without the surface treatment and a thermoplastic particle, each contact angle θ being determined at a coalescence temperature of the plurality of thermoplastic particles; or a time to coalescence of two thermoplastic particles and a surface-treated flow promoter particle is at least 5% less, preferably 5 to 80% less, or 5 to 50% less, or 5 to 25% less than the time to coalescence of two thermoplastic particles and the flow promoter particle without the surface treatment; or a shear stress to separate a first beam and a second beam comprising the thermoplastic composition, wherein one or more surface-treated flow promoter particles are disposed between the first and the second beams, is at least 5% greater, or 5 to 80% greater, or 5 to 50% greater than the shear stress to separate a first beam and a second beam comprising the thermoplastic composition having the flow promoter particles without the surface treatment; or a stress required to peel apart a first beam and a second beam comprising the thermoplastic composition, wherein one or more surface-treated flow promoter particles are disposed between the first and the second beams, is at least 5% greater, or 5 to 80% greater, or 5 to 50% greater than the stress required to peel apart a first beam and a second beam comprising the thermoplastic composition having the flow promoter particles without the surface treatment.

Embodiment 5: A powder composition comprising a plurality of thermoplastic particles comprising thermoplastic composition, the particles having a D50 from 10 nanometer to 1 millimeter, and a plurality of flow promoter particles comprising a flow promoter composition, and having a mean size from 1 nanometer to 500 micrometer, wherein the mean size is at least 50%, at least 60%, or 70-99.99% smaller than the D50, preferably 80 to 99.99% smaller than the D50, more preferably 99.95 to 99.98% smaller than the D50; wherein: the amount of flow promoter particles is selected to provide an SAC of 0.05 to 0.95, preferably 0.10 to 0.60, more preferably 0.15 to 0.50, in accordance with the relationship:

$$SAC = \frac{m_g}{m_h}\left(\frac{\rho_h R_h^3}{4\rho_g(R_h + R_g)^2 R_g}\right)$$

wherein SAC is the surface area concentration of the flow promoter particles on the outer surface of the thermoplastic particles; $R_h$ is the average radius of the thermoplastic particles, $R_g$ is the average radius of the flow promoter particles, $\rho_h$ is the average density of the thermoplastic particles, $\rho_g$ is the average density of the flow promoter particles, $m_h$ is the mass value of the thermoplastic particles, and $m_g$ is the mass value of the flow promoter particles; and a contact angle θ between a flat surface comprising the flow promoter composition and a thermoplastic particle at a coalescence temperature of the plurality of thermoplastic particles is less than 150 degrees, or 10 to 120 degrees, or 5 to 90 degrees, or 1 to 60 degrees.

Embodiment 6: The powder composition of any one or more of embodiments 1 to 5, wherein at least a portion of the plurality of flow promoter particles comprise a surface treatment effective to render the surfaces more hydrophobic than the untreated surfaces, preferably wherein the surface treatment comprises surface derivatization with an organic reagent, polymer encapsulation, or a combination comprising at least one of the foregoing.

Embodiment 7: The powder composition of any one or more of embodiments 1 to 6, wherein the coalescence temperature of the thermoplastic particles is 10 to 25° C. above the Tg of the thermoplastic polymer composition or at least 1° C. above the Tm, preferably 10 to 15° C. above the Tg of the thermoplastic polymer composition, or 1 to 15° C. above the Tm of the thermoplastic polymer composition.

Embodiment 8: The powder composition of any one or more of embodiments 1 to 7, wherein the thermoplastic particles have a D50 of 10 nanometer to 500 micrometer, or 10 nanometer to 200 micrometer, or 25 nanometer to 50 μm; and the flow promoter particles have a mean size of 1 nanometer to 200 micrometer, 1 nanometer to 500 nanometer, or 10 nanometer to 50 nanometer.

Embodiment 9: The powder composition of any one or more of embodiments 1 to 7, wherein the thermoplastic particles have a D50 of 10 nanometer to 500 micrometer, or 1 micrometer to 300 micrometer, or 10 micrometer to 200 micrometer; and the flow promoter particles have a mean size of 1 nanometer to 200 micrometer, 1 nanometer to 500 nanometer, or 10 nanometer to 50 nanometer.

Embodiment 10: The powder composition of any one or more of embodiments 1 to 7, wherein the thermoplastic particles have a D50 of 10 nanometer to 600 micrometer, or 1 micrometer to 500 micrometer, or 10 micrometer to 300 micrometer; and the flow promoter particles have a mean size of 1 nanometer to 200 micrometer, 1 nanometer to 500 nanometer, or 10 nanometer to 50 nanometer.

Embodiment 11: The powder composition of any one or more of embodiments 1 to 10, wherein the thermoplastic polymer is amorphous.

Embodiment 12: The powder composition of any one or more of embodiments 1 to 11, wherein the thermoplastic polymer is a polyacetal, poly($C_{1-6}$ alkyl)acrylate, polyacrylamide, polyamide, polyamideimide, polyanhydride, polyarylate, polyarylene ether, polyarylene sulfide, polyarylsulfone, polybenzothiazole, polybenzoxazole, polycarbonate, polyester, polyetheretherketone, polyetherimide, polyetherketoneketone, polyetherketone, polyethersulfone, polyimide, poly($C_{1-6}$ alkyl)methacrylate, polymethacrylamide, polynorbornenes, polyolefin, polyoxadiazole, polyoxymethylene, polyphthalide, polysilazane, polysiloxane, polystyrene, polysulfide, polysulfonamide, polysulfonate, polysulfone, polythioester, polytriazine, polyurea, polyurethane, polyvinyl alcohol, polyvinyl ester, polyvinyl ether, polyvinyl halide, polyvinyl ketone, polyvinyl thioether, polyvinylidene fluoride, or a combination comprising at least one of the foregoing thermoplastic polymers; preferably wherein the thermoplastic polymer is a polycarbonate, a polyetherimide, a polyimide, a polysulfone, a polyethersulfone, a polyphenylene sulfone, a polyarylene ether, a polyetherether ketone, a polyamide, or a combination comprising at least one of the foregoing, preferably a polycarbonate, a polyetherimide, or a combination comprising at least one of the foregoing.

Embodiment 13: The powder composition of any one or more of embodiments 1 to 12, wherein the thermoplastic composition further comprises a particulate filler, antioxidant, heat stabilizer, light stabilizer, ultraviolet light stabilizer, ultraviolet light-absorbing compound, near infrared light-absorbing compound, infrared light-absorbing compound, plasticizer, lubricant, release agent, antistatic agent, anti-fog agent, antimicrobial agent, colorant, surface effect additive, radiation stabilizer, flame retardant, anti-drip agent, fragrance, or a combination comprising one or more of the foregoing, preferably a colorant.

Embodiment 14: The powder composition of any one or more of embodiments 1 to 13, wherein the flow promoter comprises a metal oxide, preferably fumed silica, fumed aluminum oxide, a hydrated silica, amorphous alumina, a glassy silica, a glassy phosphate, a glassy borate, a glassy oxide, titania, talc, mica, a fumed silica, kaolin, attapulgite, calcium silicate, alumina, magnesium silicate, or a combination comprising at least one of the foregoing, more preferably fumed silica.

Embodiment 15: A method of preparing a three-dimensional article, the method comprising: providing the powder composition of any one or more of embodiments 1 to 14; and powder bed fusing the powder composition to form a three-dimensional article.

Embodiment 16: The method of embodiment 15, wherein the powder bed fusing comprises selective laser sintering.

Embodiment 17: A method of preparing a three-dimensional article, the method comprising: compression molding the powder composition of any one or more of embodiments 1 to 14 to form the three-dimensional article.

Embodiment 18: A three-dimensional article made by the method of any one or more of embodiments 15 to 17.

Embodiment 19: A method of preparing a powder coating on a substrate, the method comprising: applying a powder coating layer comprising the powder composition of any one or more of embodiments 1 to 14 to a substrate; and consolidating the powder coating layer to form the powder coating.

Embodiment 20: A powder-coated article made by the method of embodiment 19.

In general, the compositions, methods, and articles can alternatively comprise, consist of, or consist essentially of, any appropriate components or steps herein disclosed. The compositions, methods, and articles can additionally, or alternatively, be formulated so as to be devoid, or substantially free, of any components, materials, ingredients, adjuvants or species that are not necessary to the achievement of the function or objectives of the present claims.

All ranges disclosed herein are inclusive of the endpoints, and the endpoints are independently combinable with each other. "Or" means "and/or." "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. Reference throughout the specification to "another embodiment," "an embodiment," and so forth, means that a particular element described in connection with the embodiment is included in at least one embodiment described herein, and may or may not be present in other embodiments. In addition, it is to be understood that the described elements may be combined in any suitable manner in the various embodiments.

As used herein, the term "hydrocarbyl" includes groups containing carbon, hydrogen, and optionally one or more heteroatoms (e.g., 1, 2, 3, or 4 atoms such as halogen, O, N, S, P, or Si). "Alkyl" means a branched or straight chain, saturated, monovalent hydrocarbon group, e.g., methyl, ethyl, i-propyl, and n-butyl. "Alkylene" means a straight or branched chain, saturated, divalent hydrocarbon group (e.g., methylene (—$CH_2$—) or propylene (—$(CH_2)_3$—)). "Alkenyl" and "alkenylene" mean a monovalent or divalent, respectively, straight or branched chain hydrocarbon group having at least one carbon-carbon double bond (e.g., ethenyl (—HC=$CH_2$) or propenylene (—HC($CH_3$)=$CH_2$—). "Alkynyl" means a straight or branched chain, monovalent hydrocarbon group having at least one carbon-carbon triple bond (e.g., ethynyl). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group, respectively, of the formula —$C_nH_{2n-x}$ and —$C_nH_{2n-2x}$— wherein x is the number of cyclization(s). "Aryl" means a monovalent, monocyclic or polycyclic aromatic group (e.g., phenyl or naphthyl). "Arylene" means a divalent, monocyclic or polycyclic aromatic group (e.g., phenylene or naphthylene). The prefix "halo" means a group or compound including one more halogen (F, Cl, Br, or I) substituents, which can be the same or different. The prefix "hetero" means a group or compound that includes at least one ring member that is a heteroatom (e.g., 1, 2, or 3 heteroatoms, wherein each heteroatom is independently N, O, S, or P.

"Substituted" means that the compound or group is substituted with at least one (e.g., 1, 2, 3, or 4) substituents instead of hydrogen, where each substituent is independently nitro (—$NO_2$), cyano (—CN), hydroxy (—OH), halogen, thiol (—SH), thiocyano (—SCN), $C_{1-6}$ alkyl, $C_{2-6}$ alkenyl, $C_{2-6}$ alkynyl, $C_{1-6}$ haloalkyl, $C_{1-9}$ alkoxy, $C_{1-6}$ haloalkoxy, $C_{3-12}$ cycloalkyl, $C_{5-18}$ cycloalkenyl, $C_{6-12}$ aryl, $C_{7-13}$ arylalkylene (e.g, benzyl), $C_{7-12}$ alkylarylene (e.g, toluyl), $C_{4-12}$ heterocycloalkyl, $C_{3-12}$ heteroaryl, $C_{1-6}$ alkyl sulfonyl (—S(=O)$_2$-alkyl), $C_{6-12}$ arylsulfonyl (—S(=O)$_2$-aryl), or tosyl ($CH_3C_6H_4SO_2$—), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the group, including those of the substituent(s).

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A powder composition, comprising:
a plurality of thermoplastic particles comprising a thermoplastic composition, the particles having a D50 from 10 nanometer to 1 millimeter, wherein the thermoplastic composition comprises a thermoplastic polymer that is a polycarbonate, a polyetherimide, or a combination thereof, and
a plurality of comprising a flow promoter composition, and having a mean size from 1 nanometer to 500 micrometer, wherein the mean size is at least 50% smaller than the D50;
wherein at least a portion of the plurality of flow promoter particles are surface-treated, and wherein
a contact angle θ between a flat surface comprising the same flow promoter composition with the same surface treatment and a thermoplastic particle is at least 5% less than a contact angle θ between a flat surface of the same flow promoter composition without the surface treatment and a thermoplastic particle, each contact angle θ being determined at a coalescence temperature of the plurality of thermoplastic particles; or
a time to coalescence of two thermoplastic particles and a surface-treated flow promoter particle is at least 5% less than the time to coalescence of two thermoplastic particles and the flow promoter particle without the surface treatment; or
a shear stress to separate a first beam and a second beam adjacent to the first beam comprising the thermoplastic composition, wherein one or more surface-treated flow promoter particles are disposed between the first and the second beams, is at least 5% greater than the shear stress to separate a first beam and a second beam comprising the thermoplastic composition having the flow promoter particles without the surface treatment; or
a stress required to peel apart a first beam and a second beam adjacent to the first beam comprising the thermoplastic composition, wherein one or more surface-treated flow promoter particles are disposed between the first and the second beams, is at least 5% greater than the stress required to peel apart a first beam and a second beam comprising the thermoplastic composition having the flow promoter particles without the surface treatment.

2. A powder composition comprising
a plurality of thermoplastic particles comprising thermoplastic composition, the particles having a D50 from 10 nanometer to 1 millimeter, wherein the thermoplastic composition comprises a thermoplastic polymer that is a polycarbonate, a polyetherimide, or a combination thereof, and
a plurality of flow promoter particles comprising a flow promoter composition, and having a mean size from 1 nanometer to 500 micrometer, wherein the mean size is at least 50% smaller than the D50;

wherein:
the amount of flow promoter particles provides an SAC of 0.05 to 0.95, in accordance with the relationship:

$$SAC = \frac{m_g}{m_h}\left(\frac{\rho_h R_h^3}{4\rho_g(R_h + R_g)^2 R_g}\right)$$

wherein
SAC is the surface area concentration of the flow promoter particles on the outer surface of the thermoplastic particles;
$R_h$ is the average radius of the thermoplastic particles,
$R_g$ is the average radius of the flow promoter particles,
$\rho_h$ is the average density of the thermoplastic particles,
$\rho_g$ is the average density of the flow promoter particles,
$m_h$ is the mass value of the thermoplastic particles, and
$m_g$ is the mass value of the flow promoter particles; and
a contact angle θ between a flat surface comprising the flow promoter composition and a thermoplastic particle at a coalescence temperature of the plurality of thermoplastic particles is less than 150 degrees.

3. A powder composition, comprising:
a plurality of thermoplastic particles comprising thermoplastic composition, the particles having a D50 from 10 nanometer to 1 millimeter, wherein the thermoplastic composition comprises a thermoplastic polymer that is a polycarbonate, a polyetherimide, or a combination thereof, and
a plurality of flow promoter particles comprising a flow promoter composition, and having a mean size from 1 nanometer to 500 micrometer, wherein the mean size is at least 50% smaller than the D50; and
wherein a contact angle θ between a flat surface comprising the flow promoter composition and a thermoplastic particle at a coalescence temperature of the plurality of thermoplastic particles is less than 150 degrees.

4. The powder composition of claim 3, wherein the flow promoting composition provides a contact angle θ between a flat surface comprising the flow promoter composition and a thermoplastic particle at the coalescence temperature of the plurality of thermoplastic particles that is at least 5% less than the contact angle θ of at least one comparative surface and the thermoplastic particle at the coalescence temperature of the plurality of thermoplastic particles, wherein the at least one comparative flat surface comprises silica, alumina, or titania, each independently having a purity of 99.99% and a surface roughness within 10% of the surface roughness of the flow promoter flat surface.

5. The powder composition of claim 3,
wherein at least a portion of the plurality of flow promoter particles comprise a surface treatment effective to render the surfaces more hydrophobic than the untreated surfaces.

6. The powder composition of claim 3, wherein the coalescence temperature of the thermoplastic particles is 10 to 25° C. above the Tg of the thermoplastic polymer composition or at least 1° C. above the Tm above the Tg of the thermoplastic polymer composition.

7. The powder composition of claim 3, wherein
the thermoplastic particles have a D50 of 10 nanometer to 200 micrometer; and
the flow promoter particles have a mean size of 1 nanometer to 200 micrometer.

8. The powder composition of claim 3, wherein
the thermoplastic particles have a D50 of 10 nanometer to 500 micrometer; and
the flow promoter particles have a mean size of 1 nanometer to 200 micrometer.

9. The powder composition of claim 3, wherein
the thermoplastic particles have a D50 of 10 nanometer to 600 micrometer; and
the flow promoter particles have a mean particle size of 1 nanometer to 200 micrometer.

10. The powder composition of claim 3, wherein the thermoplastic polymer is amorphous.

11. The powder composition of claim 3,
wherein the thermoplastic polymer is a polyetherimide.

12. The powder composition of claim 3, wherein the thermoplastic composition further comprises a particulate filler, antioxidant, heat stabilizer, light stabilizer, ultraviolet light stabilizer, ultraviolet light-absorbing compound, near infrared light-absorbing compound, infrared light-absorbing compound, plasticizer, lubricant, release agent, antistatic agent, anti-fog agent, antimicrobial agent, colorant, surface effect additive, radiation stabilizer, flame retardant, anti-drip agent, fragrance, or a combination comprising one or more of the foregoing.

13. The powder composition of claim 3,
wherein the flow promoter comprises a metal oxide.

14. A method of preparing a three-dimensional article, the method comprising:
powder bed fusing the powder composition of claim 3 to form a three-dimensional article.

15. The method of claim 14, wherein powder bed fusing comprises selective laser sintering.

16. A three-dimensional article made by the method of claim 14.

17. A method of preparing a three-dimensional article, the method comprising:
compression molding the powder composition of claim 3 to form the three-dimensional article.

18. A method of preparing a powder coating on a substrate, the method comprising:
applying a powder coating layer comprising the powder composition of claim 3 to a substrate; and
consolidating the powder coating layer to form the powder coating.

19. A powder-coated article made by the method of claim 18.

* * * * *